United States Patent
Ohashi

(10) Patent No.: US 11,906,322 B2
(45) Date of Patent: Feb. 20, 2024

(54) ENVIRONMENT MAP MANAGEMENT DEVICE, ENVIRONMENT MAP MANAGEMENT SYSTEM, ENVIRONMENT MAP MANAGEMENT METHOD, AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 241 days.

(21) Appl. No.: 17/431,520

(22) PCT Filed: Mar. 1, 2019

(86) PCT No.: PCT/JP2019/008193
§ 371 (c)(1),
(2) Date: Aug. 17, 2021

(87) PCT Pub. No.: WO2020/178916
PCT Pub. Date: Sep. 10, 2020

(65) Prior Publication Data
US 2022/0136858 A1    May 5, 2022

(51) Int. Cl.
*G01C 21/00* (2006.01)
*G06Q 50/30* (2012.01)

(52) U.S. Cl.
CPC ......... *G01C 21/3807* (2020.08); *G06Q 50/30* (2013.01)

(58) Field of Classification Search
CPC ............ G01C 21/3807; G01C 21/3848; G06Q 50/10; G06Q 50/30
See application file for complete search history.

(56) References Cited

U.S. PATENT DOCUMENTS 9,449,023 B2    9/2016    Kenichiro
9,811,734 B2    11/2017    Williams
(Continued)

FOREIGN PATENT DOCUMENTS

| JP | 2011186808 A | 9/2011 |
| JP | 2013242738 A | 12/2013 |
| JP | 2018519558 A | 7/2018 |

OTHER PUBLICATIONS

Decision to Grant a Patent for corresponding JP Application No. 2021-503266, 4 pages, dated Dec. 28, 2022.
(Continued)

*Primary Examiner* — Dale Moyer
(74) *Attorney, Agent, or Firm* — Matthew B. Dernier, Esq.

(57) ABSTRACT

Provided are an environment map management device, an environment map management system, an environment map management method, and a program that are capable of generating a common environment map that takes into consideration privacy of each of users simultaneously with securing a space covered by an environment map available to the each of users. A processing data transmitting section accesses an individual environment map available to a user of interest. The processing data transmitting section accesses a common environment map available to a plurality of users including the user of interest. A SLAM processing execution section adds, to the individual environment map, environment information generated on the basis of sensing data acquired by a tracker used by the user of interest. A transmitting control section controls whether or not to add the environment information to the common environment map, according to a privacy attribute corresponding to the environment information.

9 Claims, 4 Drawing Sheets

(56) References Cited

U.S. PATENT DOCUMENTS

| | | | |
|---|---|---|---|
| 9,854,206 B1* | 12/2017 | Ren | H04N 7/147 |
| 2011/0224902 A1 | 9/2011 | Oi | |
| 2013/0174213 A1* | 7/2013 | Liu | G02B 27/017 |
| | | | 726/1 |
| 2014/0090087 A1* | 3/2014 | Ichijo | H04W 4/024 |
| | | | 726/28 |
| 2016/0335497 A1 | 11/2016 | Williams | |
| 2018/0350216 A1* | 12/2018 | Satkin | G08B 13/19639 |
| 2019/0108623 A1* | 4/2019 | Carey | H04L 65/61 |
| 2020/0104522 A1* | 4/2020 | Collart | G06T 19/20 |

OTHER PUBLICATIONS

International Search Report for corresponding PCT Application No. PCT/JP2019/008193, 3 pages, dated May 14, 2019.

* cited by examiner

ENVIRONMENT MAP MANAGEMENT DEVICE, ENVIRONMENT MAP MANAGEMENT SYSTEM, ENVIRONMENT MAP MANAGEMENT METHOD, AND PROGRAM

TECHNICAL FIELD

The present invention relates to an environment map management device, an environment map management system, an environment map management method, and a program.

BACKGROUND ART

There is known a SLAM (Simultaneous Localization and Mapping) technology for estimating the position of a tracker and generating an environment map.

Such a SLAM technology allows an environment map to be generated on the basis of sensing data acquired by the tracker, such as a shot image obtained by shooting by a camera equipped in the tracker, for example. The environment map generated in this way is used in various kinds of processing such as VR (Virtual Reality) display processing and AR (Augmented Reality) display processing.

SUMMARY

Technical Problems

The inventor has been considering allowing the environment map to be updated by a plurality of users each wearing a tracker to generate a common environment map available to the plurality of users. The presence of such a common environment map is convenient because it enables point clouds, 3D (Three-Dimensional) meshes, etc., having been added to the common environment map by other users to be displayed in the estimation of a global position or a global orientation of the tracker, the VR display processing, the AR display processing, etc.

In order to enable the estimation of the global position or the global orientation of the tracker at various places and enable the VR display processing and the AR display processing with respect to various places, a space covered by an environment map available to a user is preferred to be larger. From this point of view, it is desirable that a lot of environment information is added to the common environment map by a large number of users.

On the other hand, however, it is undesirable that environment information regarding private spaces such as user's home is added to the common environment map and is used by other users.

The present invention has been made in view of the above problems, and an object of the present invention is to provide an environment map management device, an environment map management system, an environment map management method, and a program that are capable of generating a common environment map that takes into consideration privacy of each of users simultaneously with securing a space covered by an environment map available to the each of users.

Solution to Problems

In order to solve the above problems, an environment map management device according to the present invention includes an individual environment map access section that accesses an individual environment map available to a user of interest, a common environment map access section that accesses a common environment map available to a plurality of users including the user of interest, an addition section that adds environment information generated on the basis of sensing data acquired by a tracker used by the user of interest to the individual environment map, and an addition control section that, according to a privacy attribute corresponding to the environment information, controls whether or not to add the environment information to the common environment map.

In a mode of the present invention, a determination section that, on the basis of the sensing data, determines the privacy attribute corresponding to the environment information, the privacy attribute being associated with a position of the tracker, is further included, and according to the privacy attribute corresponding to the environment information and associated with the position of the tracker, the addition control section controls whether or not to add, to the common environment map, the environment information that is generated on the basis of the sensing data acquired at the position of the tracker.

In this mode, the determination section determines the privacy attribute corresponding to the environment information and associated with the position of the tracker on the basis of the position of the tracker and a position at which the environment information is represented in the common environment map.

In this case, the determination section may determine the privacy attribute corresponding to the environment information and associated with the position of the tracker on the basis of a result of a determination as to whether or not there is a wall between the position of the tracker and the position at which the environment information is represented in the common environment map.

Further, the determination section may determine the privacy attribute corresponding to the environment information and associated with the position of the tracker further on the basis of a result of a determination as to whether or not there is a ceiling at the position of the tracker.

Further, an environment map management system according to the present invention includes an individual environment map management device and a common environment map management device. The individual environment map management device includes an individual environment map access section that accesses an individual environment map available to a user of interest, the user of interest using the individual environment map management device, a common environment map access section that accesses a common environment map available to a plurality of users including the user of interest, an environment information generation section that generates environment information on the basis of sensing data acquired by a tracker used by the user of interest, an individual addition section that adds the environment information to the individual environment map, and a transmitting control section that, according to a privacy attribute corresponding to the environment information, controls whether or not to transmit the environment information to the common environment map management device. The common environment map management device includes an environment information receiving section that receives the environment information transmitted from the individual environment map management device, and a common addition section that adds the environment information received by the environment information receiving section to the common environment map.

In this mode, a plurality of the individual environment map management devices is included, and the environment information receiving section may receive the environment information transmitted from each of the plurality of individual environment map management devices.

Further, an environment map management method according to the present invention includes a step of accessing an individual environment map available to a user of interest, a step of accessing a common environment map available to a plurality of users including the user of interest, a step of adding environment information generated on the basis of sensing data acquired by a tracker used by the user of interest to the individual environment map, and a step of, according to a privacy attribute corresponding to the environment information, controlling whether or not to add the environment information to the common environment map.

Further, a program according to the present invention causes a computer to execute a procedure of accessing an individual environment map available to a user of interest, a procedure of accessing a common environment map available to a plurality of users including the user of interest, a procedure of adding environment information generated on the basis of sensing data acquired by a tracker used by the user of interest to the individual environment map, and a procedure of, according to a privacy attribute corresponding to the environment information, controlling whether or not to add the environment information to the common environment map.

DESCRIPTION OF EMBODIMENT

Hereinafter, an embodiment of the present invention will be described in detail on the basis of the drawings.

Figure 1:
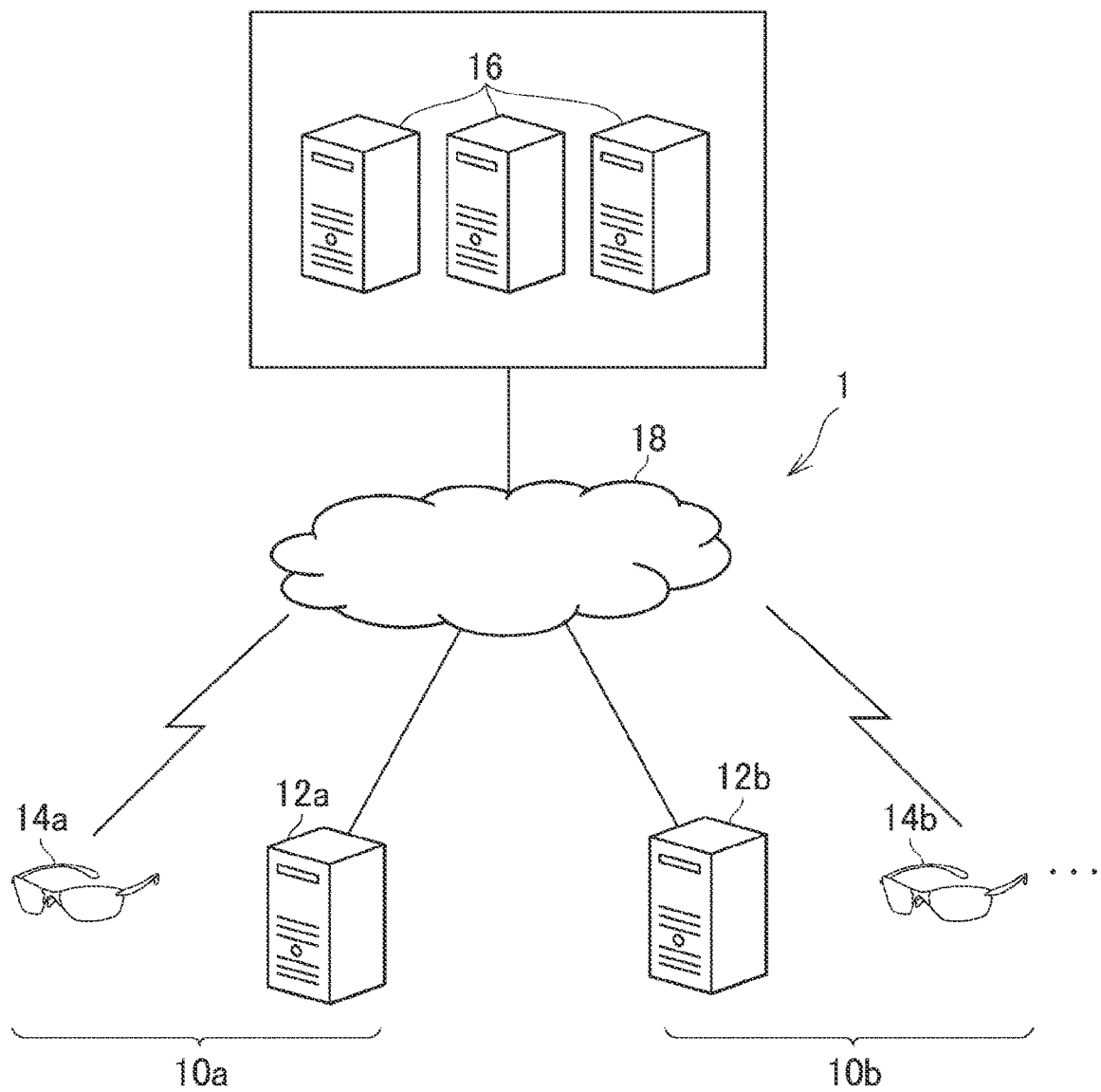
FIG. 1 is a configuration diagram illustrating an example of an environment map management system according to an embodiment of the present invention.

FIG. 1 is a configuration diagram illustrating an example of an environment map management system 1 according to the embodiment of the present invention. As illustrated in FIG. 1, the environment map management system 1 according to the present embodiment includes a plurality of user systems 10. Further, the user systems 10 according to the present embodiment each include a corresponding one of user servers 12 and a corresponding one of trackers 14. FIG. 1 illustrates, as an example, two user systems 10a and 10b. The user system 10a includes a user server 12a and a tracker 14a. The user system 10b includes a user server 12b and a tracker 14b. Further, the environment map management system 1 according to the present embodiment also includes a common server 16.

In the present embodiment, for example, it is assumed that each of a plurality of users using the environment map management system 1 manages a user system 10 of the each of the users. Further, it is assumed that each of the users is unable to access user systems 10 managed by the other users.

The user servers 12, the trackers 14, and the common server 16 are coupled to a computer network 18 such as the Internet. Further, in the present embodiment, each of the user servers 12 and the common server 16 are communicable with each other. Further, in the present embodiment, a user server 12 included in each of the user systems 10 and a tracker 14 included in the each of the user systems 10 are communicable with each other.

Such a user server 12 according to the present embodiment is, for example, a server computer used by a user of the environment map management system 1. Note that the user server 12 is not necessarily a sever operated by the user itself and may be a cloud server that is, for example, operated by a business proprietor running a cloud service.

Figure 2A:
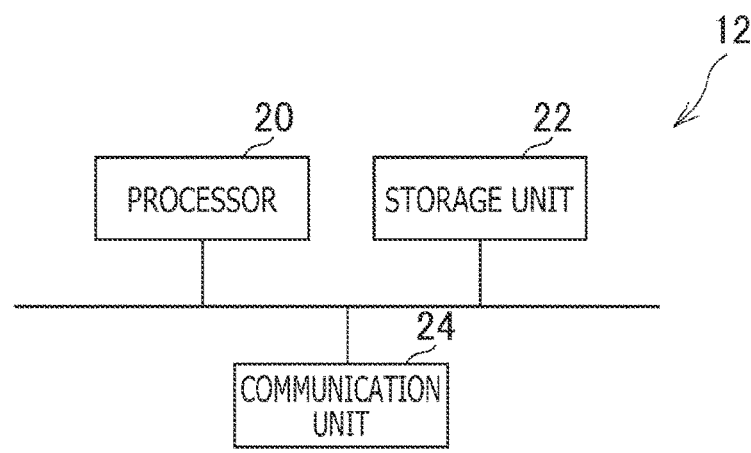
FIG. 2A is a configuration diagram illustrating an example of a user server according to the embodiment of the present invention.

As illustrated in FIG. 2A, the user server 12 according to the present embodiment includes a processor 20, a storage unit 22, and a communication unit 24. The processor 20 is a program control device, such as a CPU (Central Processing Unit), which operates according to, for example, a program installed in the user server 12. The storage unit 22 corresponds to memory elements such as a ROM (Read-Only Memory) and a RAM (Random Access Memory), a hard disk drive, and any other storage component. The storage unit 22 stores therein the program executed by the processor 20 and related data. The communication unit 24 corresponds to communication interfaces such as a network board and a wireless LAN (Local Area Network) module.

The tracker 14 according to the present embodiment is a device for tracking the position and orientation of a user wearing the tracker 14.

Figure 2B:
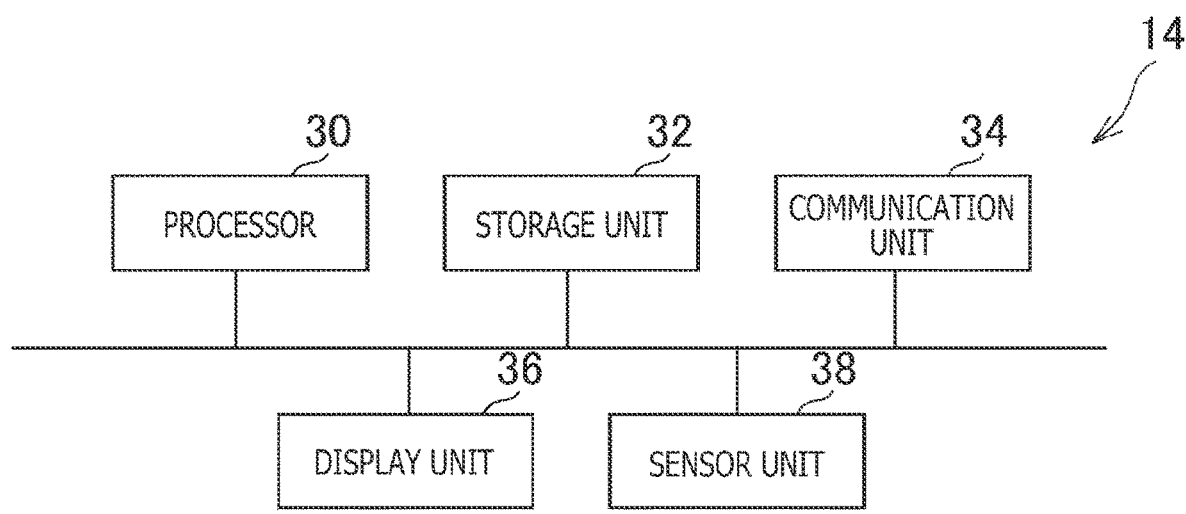
FIG. 2B is a configuration diagram illustrating an example of a tracker according to the embodiment of the present invention.

As illustrated in FIG. 2B, the tracker 14 according to the present embodiment includes a processor 30, a storage unit 32, a communication unit 34, a display unit 36, and a sensor unit 38.

The processor 30 is a program control device, such as a microprocessor, which operates according to, for example, a program installed in the tracker 14. The storage unit 32 corresponds to memory elements such as a ROM and a RAM. The storage unit 32 stores therein the program executed by the processor 30 and related data. The communication unit 34 is a communication interface such as a wireless LAN module.

The display unit 36 is a display, such as a liquid crystal display or an organic EL (Electroluminescence) display, which is arranged at the front side of the tracker 14. The display unit 36 according to the present embodiment is configured to be capable of displaying three-dimensional images by, for example, displaying images for the left eye and images for the right eye. Note that it does not matter even if the display unit 36 is a display unit that is incapable of displaying the three-dimensional images and is capable of displaying only two-dimensional images.

The sensor unit 38 corresponds to sensors such as a camera, an inertial sensor (IMU), a geomagnetic sensor (orientation sensor), a GPS (Global Positioning System) module, and a depth sensor. The camera included in the sensor unit 38 shoots an image at, for example, a predetermined sampling rate. Further, the geomagnetic sensor included in the sensor unit 38 outputs data indicating an orientation that the tracker 14 faces, to the processor 30 at a predetermined sampling rate. Further, the inertial sensor included in the sensor unit 38 outputs data indicating an acceleration, a rotation amount, a movement amount, and the like of the tracker 14 to the processor 30 at a predetermined sampling rate. Further, the GPS module included in the sensor unit 38 outputs data indicating a longitude and a latitude of the tracker 14 to the processor 30 at a predetermined sampling rate. The depth sensor included in the sensor unit 38 is a depth sensor using techniques such as ToF (Time of Flight), Patterned stereo, and Structured Light. The depth sensor outputs data indicating a distance from the tracker 14 to the processor 30 at a predetermined sampling rate. Further, the sensor unit 38 may include other sensors such as an RF sensor, an ultrasonic sensor, and an event-driven sensor.

In addition, the tracker 14 according to the present embodiment may include input/output ports such as an HDMI (registered trademark) (High-Definition Multimedia Interface) port, a USB (Universal Serial Bus) port, and an AUX (Auxiliary) port, a headphone, a speaker, and other components.

The common server 16 according to the present invention is, for example, a server computer, such as a cloud server, which is used by all the users using the environment map management system 1. The common server 16 according to the present invention is configured to be capable of being accessed even from any of the user systems 10 included in the environment map management system 1.

Figure 2C:
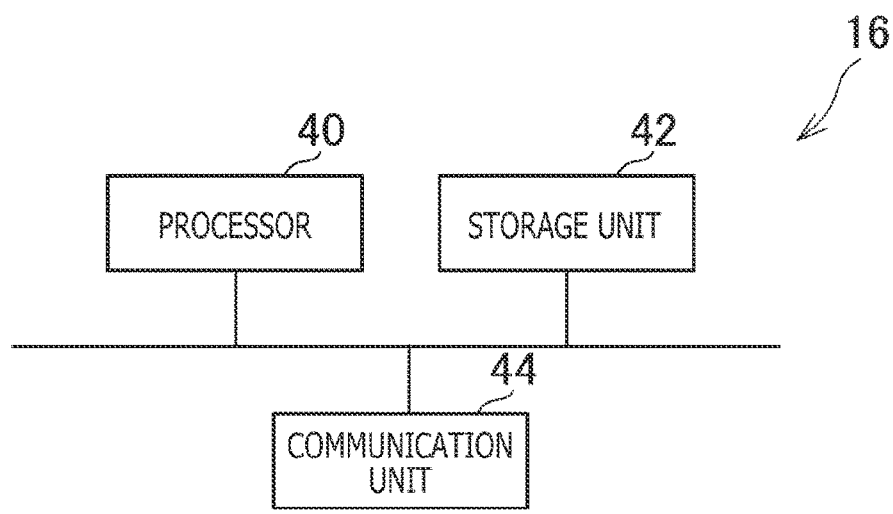
FIG. 2C is a configuration diagram illustrating an example of a common server according to the embodiment of the present invention.

As illustrated in FIG. 2C, the common server 16 according to the present embodiment includes a processor 40, a storage unit 42, and a communication unit 44. The processor 40 is a program control device, such as a CPU, which operates according to, for example, a program installed in the common server 16. The storage unit 42 corresponds to memory elements such as a ROM and a RAM, a hard disk drive, and any other storage component. The storage unit 42 stores therein the program executed by the processor 40 and related data. The communication unit 44 corresponds to communication interfaces such as a network board and a wireless LAN module.

In the present embodiment, the SLAM processing including a self-position estimation and an environment map generation is performed on the basis of sensing data acquired by the tracker 14. In the self-position estimation, for example, at least any one of a position and an orientation of the tracker 14 is estimated. Here, a global position or a global orientation of the tracker 14 may be estimated. Further, an environment map generated in such a way described above is used in various kinds of processing such as the VR display processing and the AR display processing.

Further, in the present embodiment, each of the user systems 10 uploads, to the common server 16, environment information such as part of the environment map generated in the each of the user systems 10. Further, the common server 16 generates a common environment map on the basis of the uploaded environment information. Further, every time environment information is uploaded, the common server 16 adds the environment information to the common environment map, and thereby a space covered by the common environment map increasingly becomes large.

Further, in the present embodiment, the common environment map generated in such a way as described above is available to all the user systems 10. For this reason, for example, the user system 10a is capable of performing processing using environment information having been generated by the user system 10b. Further, reversely, the user system 10b is capable of performing processing using environment information having been generated by the user system 10a.

In order to enables the estimation of the global position or the global orientation of the tracker 14 at various places as well as the VR display processing and the AR display processing with respect to various places, a space covered by an environment map available to a user is preferred to be larger. From this point of view, it is desirable that a lot of environment information is added to the common environment map by a large number of users.

On the other hand, however, it is undesirable that environment information regarding private spaces such as user's home is added to the common environment map and is used by other users.

Thus, by employing a configuration described below, the present embodiment is configured to enable the generation of a common environment map that takes into consideration the privacy of each of users simultaneously with the securement of a space covered by an environment map available to the each of users.

Hereinafter, focusing on the generation of the common environment map that takes into consideration the privacy of each of users, the functions of the user server 12a, the tracker 14a, and the common server 16 according to the present embodiment as well as processing performed by the user server 12a will be further described.

Figure 3:
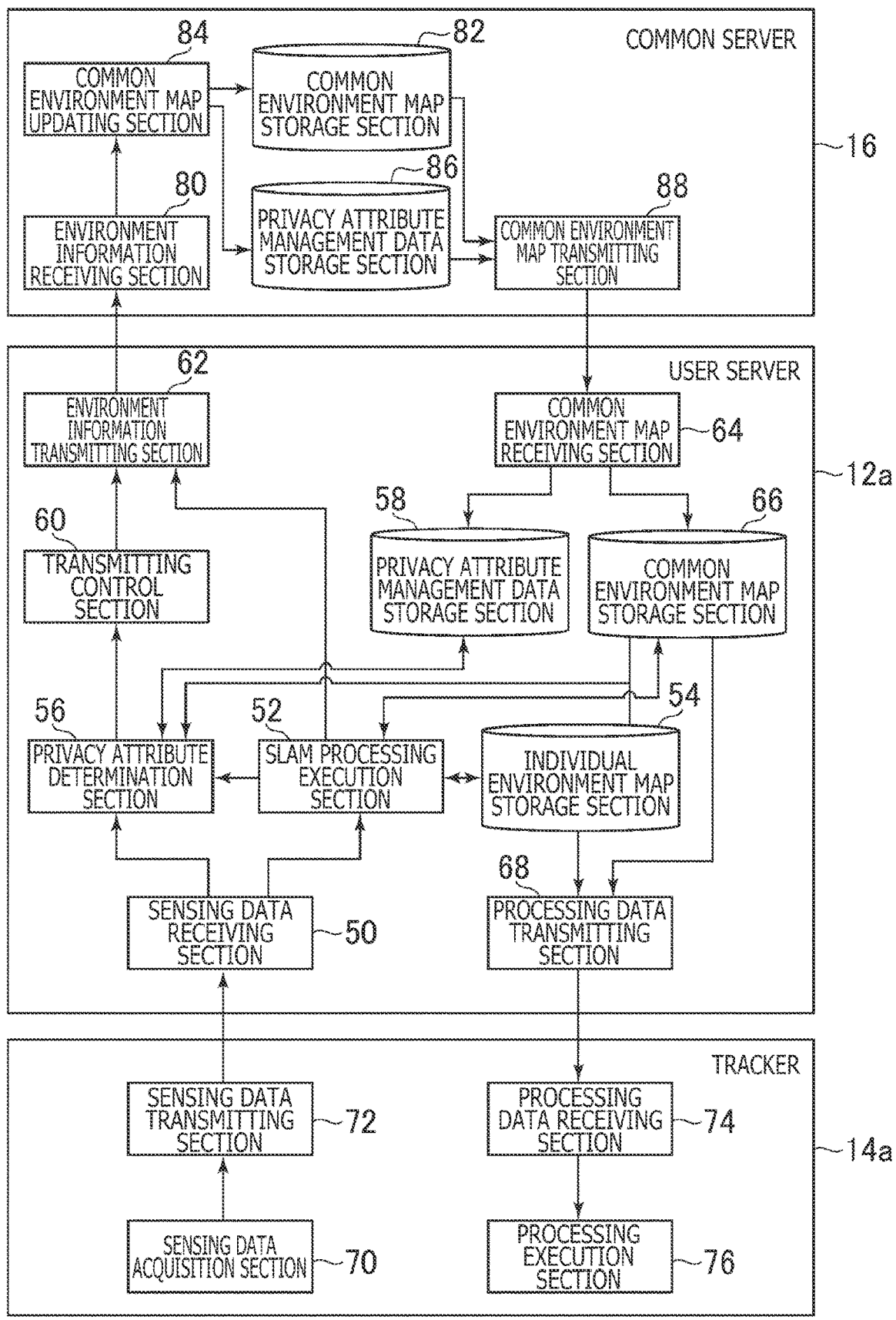
FIG. 3 is a function block diagram illustrating an example of functions implemented in the environment map management system according to the embodiment of the present invention.

FIG. 3 is a function block diagram illustrating an example of functions implemented by the user server 12a, the tracker 14a, and the common server 16 according to the present embodiment. Note that the user server 12a, the tracker 14a, and the common server 16 according to the present embodiment do not need to implement all the functions illustrated in FIG. 3, and reversely, may implement functions other than the functions illustrated in FIG. 3.

As illustrated in FIG. 3, the user server 12a functionally includes, for example, a sensing data receiving section 50, a SLAM processing execution section 52, an individual environment map storage section 54, a privacy attribute determination section 56, a privacy attribute management data storage section 58, a transmitting control section 60, an environment information transmitting section 62, a common environment map receiving section 64, a common environment map storage section 66, and a processing data transmitting section 68. The sensing data receiving section 50, the environment information transmitting section 62, the common environment map receiving section 64, and the processing data transmitting section 68 are mainly implemented by the communication unit 24. The SLAM processing execution section 52, the privacy attribute determination section 56, and the transmitting control section 60 are mainly implemented by the processor 20. The individual environment map storage section 54, the privacy attribute management data storage section 58, and the common environment map storage section 66 are mainly implemented by the storage unit 22.

The above functions may be implemented by allowing the processor 20 to execute a program that is installed in the user server 12a, which is a computer, and that includes instruction sets corresponding to the above functions. This program may be supplied to the user server 12a via a computer-readable information storage medium such as an optical disk, a magnetic disk, a magnetic tape, a magneto-optical disk, or a flash memory, or via the internet or the like.

Further, as illustrated in FIG. 3, the tracker 14a functionally includes, for example, a sensing data acquisition section 70, a sensing data transmitting section 72, a processing data receiving section 74, and a processing execution section 76. The sensing data acquisition section 70 is mainly implemented by the processor 30 and the sensor unit 38. The sensing data transmitting section 72 and the processing data receiving section 74 are mainly implemented by the communication unit 34. The processing execution section 76 is mainly implemented by the processor 30 and the display unit 36.

The above functions may be implemented by allowing the processor 30 to execute a program that is installed in the tracker 14a, which is a computer, and that includes instruction sets corresponding to the above functions. This program may be supplied to the tracker 14a via a computer-readable information storage medium such as an optical disk, a magnetic disk, a magnetic tape, a magneto-optical disk, or a flash memory, or via the internet or the like.

Further, as illustrated in FIG. 3, the common server 16 functionally includes, for example, an environment information receiving section 80, a common environment map storage section 82, a common environment map updating section 84, a privacy attribute management data storage section 86, and a common environment map transmitting section 88. The environment information receiving section 80 and the common environment map transmitting section 88 are mainly implemented by the communication unit 44. The common environment map storage section 82 and the privacy attribute management data storage section 86 are mainly implemented by the storage unit 42. The common environment map updating section 84 is mainly implemented by the processor 40.

The above functions may be implemented by allowing the processor 40 to execute a program that is installed in the common server 16, which is a computer, and that includes instruction sets corresponding to the above functions. This program may be supplied to the common server 16 via a computer-readable information storage medium such as an optical disk, a magnetic disk, a magnetic tape, a magneto-optical disk, or a flash memory, or via the internet or the like.

In the present embodiment, the sensing data acquisition section 70, for example, acquires sensing data generated by the sensor unit 38 of the tracker 14a.

The sensing data acquired by the sensing data acquisition section 70 may include, for example, an image shot by the camera included in the sensor unit 38 of the tracker 14a. Further, the sensing data acquired by the tracker 14a may include depth data measured by the camera and the depth sensor that are included in the sensor unit 38 of the tracker 14a. Further, the sensing data acquired by the tracker 14a may include data indicating an orientation of the tracker 14a and measured by the geomagnetic sensor included in the sensor unit 38 of the tracker 14a. Further, the sensing data acquired by the tracker 14a may include data indicating an acceleration, a rotation amount, a movement amount, and the like of the tracker 14a and measured by the inertial sensor included in the sensor unit 38. Further, the sensing data acquired by the tracker 14a may include data indicating a longitude and a latitude of the tracker 14a and measured by the GPS module included in the sensor unit 38. Further, the sensing data acquired by the tracker 14a may include feature point clouds (key frames).

In the present embodiment, the sensing data transmitting section 72, for example, transmits the sensing data acquired by the sensing data acquisition section 70 to the user server 12a.

In the present embodiment, the sensing data receiving section 50, for example, receives the sensing data transmitted by the tracker 14a.

In the present embodiment, the SLAM processing execution section 52, for example, performs SLAM processing including the estimation of a position or an orientation of the tracker 14a on the basis of the sensing data received by the sensing data receiving section 50. Here, a global position or a global orientation of the tracker 14 may be estimated. Here, for example, the SLAM processing execution section 52 may perform SLAM processing including relocalization processing, loop closing processing, 3D meshing processing, object recognition processing, and the like.

Here, the SLAM processing may include plane detection/ 3D-mesh segmentation processing. The plane detection/3D-mesh segmentation processing means processing for detecting continuous planes such as a ground and a wall, and segmenting an entire 3D mesh into individual 3D meshes such as a ground, a building, and a tree. Further, the SLAM processing may include 3D-mesh optimization processing. The 3D-mesh optimization processing means processing for removing, from a 3D mesh, portions estimated as moving objects, and dust caused by noise or the like, reducing the number of polygons, and smoothing the surfaces of meshes. Further, the SLAM processing may include texture generation processing. The texture generation processing means processing for generating a texture image for a 3D mesh on the basis of colors of the vertices of the meshes.

Further, the SLAM processing execution section 52 performs environment map generation processing based on the sensing data received by the sensing data receiving section 50. Hereinafter, an environment map generated in this way will be referred to as an individual environment map. Further, the SLAM processing execution section 52 causes the individual environment map storage section 54 to store the generated individual environment map.

Further, for example, the SLAM processing execution section 52 may store therein the sensing data received by the sensing data receiving section 50. Further, the SLAM processing execution section 52 may perform the SLAM processing by using a time series of the sensing data.

When performing the SLAM processing, the SLAM processing execution section 52 accesses, when needed, the individual environment map stored in the individual environment map storage section 54. Further, when performing the SLAM processing, the SLAM processing execution section 52 accesses, when needed, a common environment map, which will be described later, stored in the common environment map storage section 66.

Further, the SLAM processing execution section 52 may perform individual environment map updating processing such as the addition of environment information, which is generated on the basis of the sensing data received by the sensing data receiving section 50, to the individual environment map. Here, the environment information may include, for example, a point cloud. Further, the environment information may include a 3D mesh generated on the basis of the point cloud.

In the present embodiment, the individual environment map storage section 54, for example, stores therein the above individual environment map. The individual environment map stored in the individual environment map storage section 54 included in the user server 12a is available to a user using the user system 10a (this user being hereinafter referred to as a user of interest), but is not available to users other than the user of interest.

In the present embodiment, the privacy attribute determination section 56, for example, determines a privacy attribute corresponding to the environment information, which is generated on the basis of the sensing data received by the sensing data receiving section 50, on the basis of the sensing data. Here, for example, a privacy attribute corresponding to the environment information and associated with the position of the tracker 14a may be determined. Here, for example, it may be determined which of a position belonging to a private space and a position belonging to a public space the position of the tracker 14a is. For example, a position observable by a satellite may be determined as the position belonging to the public space. Further, for example, a position observable from the public space may be determined as the position belonging to the public space.

For example, in the case where the sensing data received by the sensing data receiving section 50 includes data indicating the position of the tracker 14a, a privacy attribute corresponding to the environment information and associated with the position of the tracker 14a may be determined. Further, for example, a privacy attribute corresponding to the environment information and associated with an estimated position of the tracker 14a, which is estimated by the SLAM processing execution section 52, may be determined.

Here, on the basis of the position of the tracker 14a and a position at which the environment information is represented in the common environment map, a privacy attribute corresponding to the environment information and associated with the position of the tracker 14a may be determined. For example, on the basis of the result of a determination as to whether or not there is a wall between the position of the tracker 14a and a position at which the environment information is represented in the common environment map, a privacy attribute corresponding to the environment information and associated with the position of the tracker 14a may be determined. Further, on the basis of the result of a determination as to whether or not there is a ceiling at the position of the tracker 14a, a privacy attribute corresponding to the environment information and associated with the position of the tracker 14a may be determined.

Further, in the present embodiment, the privacy attribute determination section 56, for example, generates privacy attribute management data that includes position data indicating the position of the tracker 14a and that includes privacy attribute data indicating the privacy attribute corresponding to the environment information and associated with the position of the tracker 14a. Further, the privacy attribute determination section 56 causes the privacy attribute management data storage section 58 to store the generated privacy attribute management data.

In the following description, in the case where it is determined that the position of the tracker 14a belongs to the private space, it is assumed that privacy attribute management data that includes position data indicating the position of the tracker 14a and that includes privacy attribute data whose value is 1 is stored in the privacy attribute management data storage section 58. Further, in the case where it is determined that the position of the tracker 14a belongs to the public space, it is assumed that privacy attribute management data that includes the position data indicating the position of the tracker 14a and that includes privacy attribute data whose value is 0 is stored in the privacy attribute management data storage section 58.

The privacy attribute management data storage section 58 stores therein the above privacy attribute management data.

In the present embodiment, the transmitting control section 60, for example, controls whether or not to add the environment information generated on the basis of the sensing data to the common environment map, according to the privacy attribute determined by the privacy attribute determination section 56.

Here, for example, it may be controlled according to a privacy attribute corresponding to the position of the tracker 14a whether or not to add environment information generated on the basis of sensing data acquired at the position of the tracker 14a to the common environment map. For example, in the case where it has been determined that a position at which the tracker 14a lies and which corresponds to sensing data belongs to the public space, the transmitting control section 60 may control the environment information transmitting section 62 such that environment information generated on the basis of the sensing data is transmitted.

Reversely, in the case where it has been determined that a position at which the tracker 14a lies and which corresponds to sensing data belongs to the privacy space, environment information generated on the basis of the sensing data may be controlled so as not to be added to the common environment map.

In the present embodiment, the environment information transmitting section 62, for example, transmits the environment information to the common server 16. As described above, it may be controlled by the transmitting control section 60 whether or not the environment information transmitting section 62 is to transmit the environment information to the common server 16. For example, in the case where it has been determined that a position at which the tracker 14a lies and which corresponds to sensing data belongs to the public space, the environment information transmitting section 62 transmits environment information generated on the basis of the sensing data to the common server 16. Further, privacy attribute management data that includes position data indicating the position at which the tracker 14a lies and which corresponds to the sensing data and that includes privacy attribute data whose value is 0 may be associated with the environment information.

In the present embodiment, the environment information receiving section 80, for example, receives the environment information transmitted by the environment information transmitting section 62.

In the present embodiment, the common environment map storage section 82, for example, stores therein the common environment map.

In the present embodiment, the common environment map updating section 84, for example, updates the common environment map stored in the common environment map storage section 82 on the basis of the environment information received by the environment information receiving section 80. Here, for example, the common environment map updating section 84 may add the environment information received by the environment information receiving section 80 to the common environment map. Further, the common environment map updating section 84 may perform the loop closing processing on the common environment map.

Further, the common environment map updating section 84 may cause the privacy attribute management data storage section 86 to store the privacy attribute management data associated with the environment information having been received by the environment information receiving section 80.

In the present embodiment, the privacy attribute management data storage section 86, for example, stores therein the privacy attribute management data associated with the environment information having been received by the environment information receiving section 80.

In the present embodiment, the common environment map transmitting section 88, for example, transmits the common environment map stored in the common environment map storage section 82 to each of the plurality of user servers 12. Here, for example, every time the common environment map is updated, an updated common environment map may be transmitted. Alternatively, for example, the common environment map may be transmitted at a predetermined time interval.

Further, the common environment map transmitting section 88 may transmit a common environment map associated with privacy attribute management data having been newly added to the common environment map storage section 82, to each of the plurality of user servers 12.

Upon receipt of the common environment map transmitted from the common server 16, the common environment map receiving section 64 causes the common environment map storage section 66 to store the common environment map.

Here, the common environment map receiving section 64 may cause the privacy attribute management data storage section 58 to store the privacy attribute management data associated with the common environment map having been received from the common server 16.

In the present embodiment, the common environment map storage section 66, for example, stores therein the common environment map.

In addition, the common environment map transmitting section 88 may transmit the environment information having been received by the environment information receiving section 80, to each of the user servers 12. Further, the common environment map receiving section 64 may add the environment information transmitted by the common environment map transmitting section 88 to the common environment map stored in the common environment map storage section 66.

In the present embodiment, the processing data transmitting section 68, for example, generates processing data used in the processing performed by the tracker 14a. When generating the processing data, the processing data transmitting section 68 accesses, when needed, the individual environment map stored in the individual environment map storage section 54. Further, when generating the processing data, the processing data transmitting section 68 accesses, when needed, the common environment map stored in the common environment map storage section 66. Further, in the present embodiment, the processing data transmitting section 68, for example, transmits the generated processing data to the tracker 14a.

Here, for example, data indicating an estimated position and an estimated orientation of the tracker 14a, such as data indicating a relocalized position and a relocalized orientation, may be transmitted. Further, for example, data regarding a 3D mesh representing an environment map may be transmitted. Further, data representing virtual objects arranged in the environment map may be transmitted. Further, for example, an image representing a condition as viewed in an orientation being inside the environment map and corresponding to the orientation of the tracker 14a from a position being inside the environment map and corresponding to the position of the tracker 14a may be transmitted.

In the present embodiment, the processing data receiving section 74, for example, receives the above processing data.

In the present embodiment, the processing execution section 76, for example, performs various kinds of processing, such as the VR display processing and the AR display processing, which use the processing data received by the processing data receiving section 74. Here, for example, upon occurrence of occlusion in an image having been shot by the camera, display control processing may be performed for causing the display unit 36 to display an image obtained by superimposing the image having been shot by the camera and a 3D mesh of an environment map in a region where the occlusion has occurred. Further, for example, display control processing may be performed for causing the display unit 36 to display a virtual object that moves along a wall, a floor, a ceiling, or the like in the environment map.

Functions similar to those of the user server 12a are also implemented in the user server 12b. Further, functions similar to those of the tracker 14a are also implemented in the tracker 14b. Communication for the sensing data and the processing data with respect to the user server 12b is performed to/from the tracker 14b.

In the present embodiment, the same common environment map is available to a plurality of users including the user of interest. On the other hand, the individual environment map stored in the individual environment map storage section 54 of the user server 12a is available to only the user of interest, and is not available to users other than the user of interest. Further, the individual environment map stored in the individual environment map storage section 54 of the user server 12b is available to only a user using the user system 10b, and is not available to the other users.

In the present embodiment, the series of processing from the acquisition of the sensing data by the tracker 14a to the execution of processing in the processing execution section 76 of the tracker 14a may be repeatedly performed at a predetermined time interval. Further, similarly, the series of processing from the acquisition of the sensing data by the tracker 14b to the execution of processing in the processing execution section 76 of the tracker 14b may be repeatedly performed at a predetermined time interval. Further, the execution of processing by the processing execution section 76 may be performed in a situation in which the acquisition of the sensing data by the tracker 14 is not made.

Figure 4:
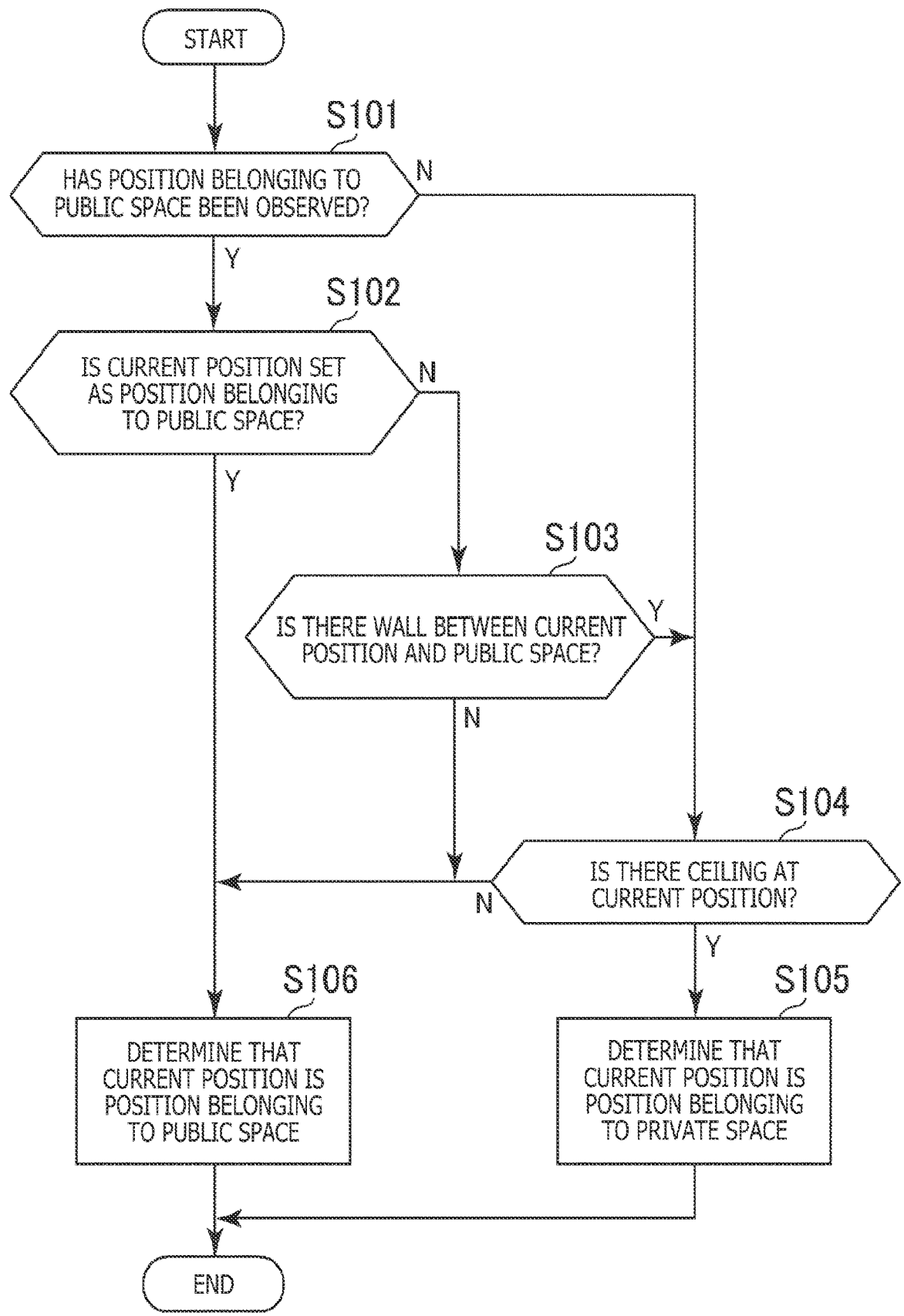
FIG. 4 is a flowchart illustrating an example of a flow of processing performed by the user server according to the embodiment of the present invention.

Here, an example of the flow of privacy attribute determination processing performed by the privacy attribute determination section 56 of the user server 12a, according to the present embodiment, will be described referring to a flowchart illustrated as an example in FIG. 4.

Note that, when the processing indicated in the present processing example is performed, it is assumed that positions observable by a satellite and positions observable from the public space have been preliminarily determined as positions belonging to the public space. Further, it is assumed that privacy attribute management data that includes pieces of position data indicating the above positions and that includes associated pieces of privacy attribute data whose values are 0 is stored in the privacy attribute management data storage section 58 and the privacy attribute management data storage section 86.

First, the privacy attribute determination section 56 determines whether or not the tracker 14a has observed the position belonging to the public space (S101). Here, on the basis of a time series of the sensing data, spaces having been observed through the sensing data may be specified. Alternatively, on the basis of an individual environment map generated on the basis of the sensing data, spaces having been observed through the sensing data may be specified. Further, it may be determined whether or not the positions indicated by the pieces of position data associated with the pieces of privacy attribute data whose values are 0 in the privacy attribute management data are included in the specified spaces. Further, in the case where the position indicated by the pieces of position data associated with the pieces of privacy attribute data whose values are 0 is included in the specified spaces, it may be determined that the position belonging to the public space has been observed. Further, in the case where none of the positions indicated by the pieces of position data associated with the pieces of privacy attribute data whose values are 0 is included in the specified spaces, it may be determined that none of positions belonging to the public space has been observed.

It is assumed that, in the processing indicated in S101, it has been determined that the tracker 14a has observed the position belonging to the public space (S101: Y). In this case, the privacy attribute determination section 56 determines whether or not the current position of the tracker 14a is set as the position belonging to the public space (S102). Here, the current position of the tracker 14a may be a position at which the tracker 14a lies and which is estimated by the SLAM processing execution section 52. Further, the current position of the tracker 14a may be a position at which the tracker 14a lies and which is indicated by the sensing data received by the sensing data receiving section 50.

In the processing indicated in S102, for example, it may be checked whether or not privacy attribute management data that includes position data indicating the current position of the tracker 14a and that includes associated privacy attribute data whose value is 0 is stored in the privacy attribute management data storage section 58. Further, in the case where such privacy attribute management data is stored in the privacy attribute management data storage section 58, it may be determined that the current position of the tracker 14a is set as the one position belonging to the public space. In contrast, in the case where such privacy attribute management data is not stored in the privacy attribute management data storage section 58, it may be determined that the current position of the tracker 14a is not set as the position belonging to the public space.

It is assumed that, in the processing indicated in S102, it has been determined that the current position of the tracker 14a is not set as the position belonging to the public space (S102: N). In this case, the privacy attribute determination section 56 determines whether or not there is a wall between the current position of the tracker 14a and the public space (S103).

In the case where, between the current position of the tracker 14a and the public space, there is a continuous plane having a certain degree of size, even though, in the plane, for example, a hole equivalent to a window or the like is formed, it may be determined that there is a wall between the current position of the tracker 14a and the public space.

Here, the above determination may be made on the basis of at least one of, for example, the individual environment map, the common environment map, privacy management level data, and the sensing data. For example, in the case where, in the environment map, there is a point cloud located along a vertical plane and occupying a region having a size larger than a predetermined size between the current position of the tracker 14a and the public space, it may be determined that there is a wall between the current position of the tracker 14a and the public space. Further, for example, in the case where the image of a wall is included in an image having been shot in a direction toward the public space, it may be determined that there is a wall between the current position of the tracker 14a and the public space. Further, in the case where it is unclear whether or not there is a wall between the current position of the tracker 14a and the public space, the determination that there is a wall between the current position of the tracker 14a and the public space may be made.

It is assumed that, in the processing indicated in S101, it has been determined that the tracker 14a has observed none of the positions belonging to the public space (S101: N). Alternatively, it is assumed that, in the processing indicated in S103, it has been determined that there is a wall between the current position of the tracker 14a and the public space (S103: Y). In these cases, the privacy attribute determination section 56 determines whether or not there is ceiling at the current position of the tracker 14a (S104).

In the case where there is a plane in a vertically upward direction of the current position of the tracker 14a, even though, in the plane, for example, a hole equivalent to a skylight or the like is formed, it may be determined that there is a ceiling at the current position of the tracker 14a.

Here, the above determination may be made on the basis of at least one of, for example, the individual environment map, the common environment map, the privacy management level data, and the sensing data. For example, in the case where, in the environment map, in an upward direction of the current position of the tracker 14a, there is a point cloud located along a horizontal plane and occupying a region having a size larger than a predetermined size, it may be determined that there is a ceiling at the current position of the tracker 14a. Further, for example, in the case where the image of a ceiling is included in an image having been shoot in a vertically upward direction, it may be determined that there is a ceiling at the current position of the tracker 14a. Further, in the case where it is unclear whether or not there is a ceiling at the current position of the tracker 14a, the determination that there is a ceiling at the current position of the tracker 14a may be made.

It is assumed that, in the processing indicated in S104, it has been determined that there is a ceiling at the current position of the tracker 14a (S104: Y). In this case, the privacy attribute determination section 56 determines that the current position of the tracker 14a is a position belonging to the private space (S105), and ends the processing indicated in the present processing example.

In this case, for example, the privacy attribute determination section 56 may generate privacy attribute management data that includes position data indicating the current position of the tracker 14a and that includes associated privacy attribute data whose value is 1. Further, the privacy attribute determination section 56 may cause the privacy attribute management data storage section 58 to store the above privacy attribute management data.

Note that, in the case where, in the processing indicated in S104, it has been determined that there is a ceiling at the current position of the tracker 14a, it may be determined that the whole of a floor-to-ceiling linear position passing through the current position of tracker 14a is a position belonging to the private space.

It is assumed that, in the processing indicated in S102, it has been determined that the current position of the tracker 14a is set as the position belonging to the public space (S102: Y). Alternatively, it is assumed that, in the processing indicated in S103, it has not been determined that there is a wall between the current position of tracker 14a and the public space (S103: N). Alternatively, it is assumed that, in the processing indicated in S104, it has not been determined that there is a ceiling at the current position of tracker 14a (S104: N). In these cases, the privacy attribute determination section 56 determines that the current position of the tracker 14a is a position belonging to the public space (S106), and ends the processing indicated in the present processing example.

In this case, for example, the privacy attribute determination section 56 may generate privacy attribute management data that includes position data indicating the current position of the tracker 14a and that includes associated privacy attribute data whose value is 0. Further, the privacy attribute determination section 56 may cause the privacy attribute management data storage section 58 to store the above privacy attribute management data.

In the present processing example, the determination that positions observable by a satellite and positions observable from the public space are positions belonging to the public space is made in advance, and this configuration consequently enables achievement of an accurate determination of the privacy attribute by the execution of the pieces of processing indicated in S101 to S106.

In the present embodiment, the user of interest is able to use both the individual environment map and the common environment map that are stored in the user server 12a. Further, environment information regarding positions belonging to private spaces of the user of interest is not added to the common environment map. For this reason, the environment information regarding the positions belonging to the private spaces of the user of interest is not used by users other than the user of interest. In this way, the present embodiment enables the generation of a common environment map that takes into consideration the privacy of each of users simultaneously with the securement of a space covered by an environment map available to the each of users.

Further, in the present embodiment, various kinds of processing on the common environment map, that is, the relocalization processing, the loop closing processing, the 3D meshing processing, the plane detection/3D-mesh segmentation processing, the 3D-mesh optimization processing, the texture generation processing, the object recognition processing, and the like, are performed in a distributed manner by the common server 16 and each of the plurality of user servers 12. For example, the generation of the environment information and the addition of the environment information to the individual environment map are performed by each of the plurality of user servers 12, and the addition of the environment information to the common environment map is performed by the common server 16. Thus, the load on the common server 16 is not so high.

Further, in the case where the user server 12 is placed at user's home or the like, a time required for the series of processing from the acquisition of the sensing data by the tracker 14a to the execution of processing by the processing execution section 76 of the tracker 14a is not so long.

The individual environment map and the time series of sensing data, which are stored in the user server 12, can be utilized as user's life logs.

Note that the present invention is not limited to the above-described embodiment.

For example, environment information corresponding to a position specified by a user, even though this position is a position that the privacy attribute determination section 56 has not determined as a position belonging to the public space, may be added to the common environment map. Further, all pieces of environment information at positions belonging to the public space are not necessarily added to the common environment map.

The role division of the user server 12, the tracker 14, and the common server 16 is not limited to the above-described role division. For example, the user system 10a may be implemented by one device doubling as the role of the user server 12a and the role of the tracker 14a. Further, the user system 10b may be implemented by one device doubling as the role of the user server 12b and the role of the tracker 14b.

For example, part or all of the functions of the user server 12a may be implemented by the tracker 14a. For example, the generation of the environment information based on the sensing data may be made in the tracker 14a. Further, the generated environment information may be transmitted from the tracker 14a to the user server 12a.

Further, part or all of the functions of the common server 16 may be implemented by the user server 12a and the tracker 14a. Further, for example, the environment map management system 1 may not include the common server 16. In this case, the user server 12a may transmit the environment information to all of the other user servers 12. Further, in each of the user servers 12, the generation of a common environment map based on the environment information received from the other user servers 12 and the environment information generated by the each of the user servers 12 may be made.

Further, in the user server 12a, an integrated environment map obtained by integrating the individual environment map and the common environment map may be generated. Further, in the user server 12a, the SLAM processing based on the integrated environment map may be performed.

The invention claimed is:

1. An environment map management device comprising:
    an individual environment map access section that accesses an individual environment map available to a user of interest;
    a common environment map access section that accesses a common environment map available to a plurality of users including the user of interest;
    an addition section that adds environment information generated on a basis of sensing data acquired by a tracker used by the user of interest to the individual environment map;
    an addition control section that, according to a privacy attribute corresponding to the environment information, controls whether or not to add the environment information to the common environment map; and
    a determination section that, on a basis of the sensing data, determines the privacy attribute corresponding to the environment information, the privacy attribute being associated with a position of the tracker.

2. The environment map management device according to claim 1,
    wherein, according to the privacy attribute corresponding to the environment information and associated with the position of the tracker, the addition control section controls whether or not to add, to the common environment map, the environment information that is generated on a basis of the sensing data acquired at the position of the tracker.

3. The environment map management device according to claim 1, wherein the determination section determines the privacy attribute corresponding to the environment information and associated with the position of the tracker on a basis of the position of the tracker and a position at which the environment information is represented in the common environment map.

4. The environment map management device according to claim 3, wherein the determination section determines the privacy attribute corresponding to the environment information and associated with the position of the tracker on a basis of a result of a determination as to whether or not there is a wall between the position of the tracker and the position at which the environment information is represented in the common environment map.

5. The environment map management device according to claim 4, wherein the determination section determines the privacy attribute corresponding to the environment information and associated with the position of the tracker further on a basis of a result of a determination as to whether or not there is a ceiling at the position of the tracker.

6. An environment map management system comprising:
an individual environment map management device; and
a common environment map management device,
wherein the individual environment map management device includes
an individual environment map access section that accesses an individual environment map available to a user of interest, the user of interest using the individual environment map management device,
a common environment map access section that accesses a common environment map available to a plurality of users including the user of interest,
an environment information generation section that generates environment information on a basis of sensing data acquired by a tracker used by the user of interest,
an individual addition section that adds the environment information to the individual environment map, and
a transmitting control section that, according to a privacy attribute corresponding to the environment information, controls whether or not to transmit the environment information to the common environment map management device,
a determination section that, on a basis of the sensing data, determines the privacy attribute corresponding to the environment information, the privacy attribute being associated with a position of the tracker, and
the common environment map management device includes
an environment information receiving section that receives the environment information transmitted from the individual environment map management device, and
a common addition section that adds the environment information received by the environment information receiving section to the common environment map.

7. The environment map management system according to claim 6, further comprising:
a plurality of the individual environment map management devices,
wherein the environment information receiving section receives the environment information transmitted from each of the plurality of individual environment map management devices.

8. An environment map management method comprising:
accessing an individual environment map available to a user of interest;
accessing a common environment map available to a plurality of users including the user of interest;
adding environment information generated on a basis of sensing data acquired by a tracker used by the user of interest to the individual environment map;
according to a privacy attribute corresponding to the environment information, controlling whether or not to add the environment information to the common environment map; and
on a basis of the sensing data, determining the privacy attribute corresponding to the environment information, the privacy attribute being associated with a position of the tracker.

9. A non-transitory, computer-readable storage medium containing a computer program, which when executed by a computer, causes the computer to perform an environment map management method by carrying out actions, comprising:
accessing an individual environment map available to a user of interest;
a procedure of accessing a common environment map available to a plurality of users including the user of interest;
adding environment information generated on a basis of sensing data acquired by a tracker used by the user of interest to the individual environment map; and
according to a privacy attribute corresponding to the environment information, controlling whether or not to add the environment information to the common environment map; and
on a basis of the sensing data, determining the privacy attribute corresponding to the environment information, the privacy attribute being associated with a position of the tracker.

* * * * *